United States Patent [19]

Krumweide

[11] 4,239,564
[45] Dec. 16, 1980

[54] METHOD FOR COATING A STRUCTURE WITH A UNIFORM FOAM LAYER

[75] Inventor: Gary C. Krumweide, San Diego, Calif.

[73] Assignee: General Dynamics Corporation, San Diego, Calif.

[21] Appl. No.: 710,041

[22] Filed: Jul. 30, 1976

Related U.S. Application Data

[63] Continuation-in-part of Ser. No. 502,586, Jan. 23, 1974, abandoned.

[51] Int. Cl.³ .................. B32B 31/18; B32B 5/20
[52] U.S. Cl. .................. 156/79; 156/344; 264/45.8; 264/46.5; 264/46.6; 264/46.7
[58] Field of Search .................. 427/373, 244; 156/78, 156/79, 344; 264/42, 466, 467, 54, DIG. 13, 45.8, 46.1, 45.3, 45.5

[56] References Cited

U.S. PATENT DOCUMENTS

| | | | |
|---|---|---|---|
| 2,770,864 | 11/1956 | Weese | 264/42 |
| 2,860,069 | 11/1958 | Petrecca | 117/10 X |
| 3,082,486 | 3/1963 | Khawam et al. | 264/46.7 X |
| 3,086,488 | 4/1963 | Johnson | 118/106 X |
| 3,172,072 | 3/1965 | Willy | 264/46.3 X |
| 3,269,882 | 8/1966 | Willy | 156/78 |
| 3,382,302 | 5/1968 | Marzocchi | 264/46.7 X |
| 3,493,449 | 3/1970 | Krug | 156/79 |
| 3,580,763 | 5/1971 | Criner et al. | 156/78 |
| 3,660,548 | 5/1972 | Komada et al. | 264/54 X |
| 3,776,790 | 12/1973 | Harrington et al. | 117/11 X |

*Primary Examiner*—Evan K. Lawrence
*Attorney, Agent, or Firm*—John R. Duncan

[57] ABSTRACT

A method for forming a layer of very uniform low density foam of uniform thickness on a surface is disclosed. A screen is positioned at a selected distance above a structure surface. The screen is positioned by lowering a tautly stretched screen over a plurality of studs upstanding from the structure surface to a selected height above said surface. A liquid, self-rising foam material is sprayed through the screen onto the structure surface. As the foam rises, it penetrates through the screen, leaving irregular projections above the screen. After the foam cures to at least a self-sustaining state, the screen is stripped away, leaving a uniform foam layer. The foam layer is bonded to the surface as it cures. Since the screen offers very little resistance to the rising foam, the resulting foam layer has a very uniform low density, highly desirable for thermal insulation application.

5 Claims, 3 Drawing Figures

METHOD FOR COATING A STRUCTURE WITH A UNIFORM FOAM LAYER

CROSS-REFERENCE TO RELATED APPLICATION

This application is a continuation-in-part of copending U.S. patent application Ser. No. 502,586, filed Sept. 3, 1974, abandoned.

BACKGROUND OF THE INVENTION

This invention relates in general to the application of foam coatings suitable for thermal insulation, and more specifically to the formation of low density foam coatings of uniform density and thickness.

Highly efficient thermal insulation materials are becoming increasingly necessary for applications such as cryogenic fuel tanks in high energy space launch vehicles, liquefied natural gas storage tanks, ships for transporting liquefied natural gas, and other similar applications. The insulation must be highly efficient, light in weight, and reasonably inexpensive to apply and maintain over very large structures.

Many insulation systems are in use today. While many, such as asbestos packing, glass fiber batts, etc., are useful when the temperature difference within and without an insulated structure is not great, most of these are unacceptable for use with cryogenic tanks where this temperature difference is in hundreds of degrees. Insufficient insulation results in, for example, an undesirable waste of cryogenic liquids due to inward heat transfer and the resulting boil-off and venting of part of the liquid.

A number of "super insulations" have been developed for applications requiring very high thermal insulation efficiency. These include multi-layer metalized plastic sheets, low density foam, etc. These insulation arrangements, while generally effective, tend to be complex, cumbersome and difficult to install and maintain on large structures. Foam often must be cut to shape from large blocks and installed piece by piece. Attempts to form foam in place directly on structures has had only limited success due to difficulties in forming insitu foam layers of uniform low density and thickness. Spraying a self-rising foam directly on a structure tends to produce layers of very uneven thickness with an undesirable rind or skin on the outside surface which are difficult and expensive to machine to a uniform thickness. Applying foam within a closed mold in contact with the structure tends to produce layers of higher density than desired, and of uneven density, since the foam cannot fully expand. Cutting holes in the mold to permit excess foam to extrude therefrom has not been successful since the resulting layer has uneven density, lower near the holes and higher elsewhere. Also, the backpressure resulting from the force needed to push excess foam through the holes tends to cause the layer to have a higher than desirable average density. The surface of the foam in contact with the mold walls tends to form an undesirable rind. Because of these difficulties in producing uniform foam insulation layers, many cryogenic applications must use the much more costly and complex multi-layer insulation systems.

Thus, there is a continuing need for improved high efficiency insulation coatings, especially for the insulation of very large structures containing materials at cryogenic temperatures.

SUMMARY OF THE INVENTION

It is, therefore, an object of this invention to provide a method for forming an insulation layer overcoming the above-noted problems.

Another object of this invention is to provide a method for applying a foam insulation which produces layers of improved density and thickness uniformity.

A further object of this invention is to provide a method of forming an insitu coating of foam insulation which is simultaneously formed and bonded to the structure being coated.

Yet another object of this invention is to provide a method for rapidly forming a uniform foam layer over large surfaces.

The above objects, and others, are accomplished by a method in which a screen sheet is spaced from said surface a selected distance on a plurality of upstanding studs, a quantity of self-rising foamable liquid is substantially uniformly applied through said screen over said surface, the foam is allowed to expand upwardly through the screen, the foam is cured to at least a self-sustaining state, self-bonded to said surface, and the screen is stripped away, removing all foam which has penetrated through the screen.

Any suitable liquid foamable material may be used. Typical foamable materials include synthetic resin materials which include a chemical "blowing agent" which reacts, releasing a gas which forms foam pores within the liquid. Other foamable liquids, for example, may include dispersed volatile liquids which form local pores upon heating or lowering of ambient pressure. The foam material itself may be any suitable material which can be foamed in a liquid state, then cured or solidified to a self-sustaining state. The resin may be cured, for example, by a catalytic reaction, heat, etc. If desired, various materials may be added to the foamable liquid to modify its properties. For example, finely chopped glass fibers may be added to increase the strength of the foam.

Typical foam materials include urethane, polyethylene, vinyls, epoxys, silicones, phenolics, urea-formaldehydes, fluorocarbons, and mixtures and copolymers thereof.

The most effective foam for insulation purposes has the lowest reasonably achievable density; that is, has the greatest proportion of small bubbles and smallest proportion of resin per unit volume. "Low density" as used in this application is a relative term which indicates a density approaching that achieved when a foamable material is allowed to foam and increase in volume without mechanical restriction. Actual density achieved, of course, varies with foam materials, pressure and temperature. Density increases where free foaming is restricted, e.g. by foaming in a closed mold or one with restricted openings for release of excess foam. Similarly, non-uniform restrictions on the foaming material will cause uneven final density. For example, a mold with few, widely spaced, openings for release of excess foam will have higher density away from the openings and lower density near the openings. In an insulation system, the lowest foam density consistent with reasonable mechanical strength in the coating is preferable for maximum insulation effect. Uneven density is also undesirable in insulation because of the varying temperature gradients through regions of higher and lower density and possible resulting "hot spots" over high density areas.

If desired, the foam layer may include reinforcements or other additives, such as one or more sheets of open, net-like, scrim cloth embedded in the foam parallel to the supporting surface, chopped fibers mixed with the foamable liquid, plasticizers, surfactants, etc.

The foam layer may be treated in any suitable manner after the screen is stripped away. For example, the surface may be lightly sanded to remove any roughness produced by the screen, coatings may be applied to seal the foam, cover sheets may be laminated onto the exposed surface, additional layers of foam may be applied, etc.

BRIEF DESCRIPTION OF THE DRAWINGS

The drawings illustrate a preferred embodiment of the method of this invention. In the drawings.

DETAILED DESCRIPTION OF THE INVENTION

Figure 1:
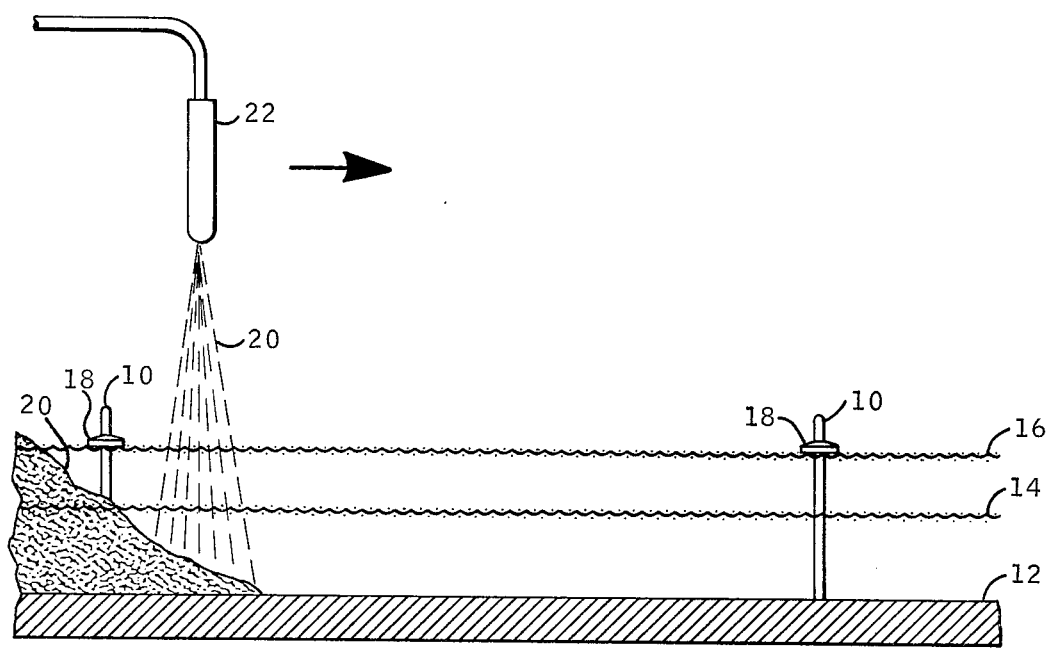
FIG. 1 is a schematic section through the screen and surface assembly taken perpendicular to the surface prior to application of a foam layer.
Figure 2:
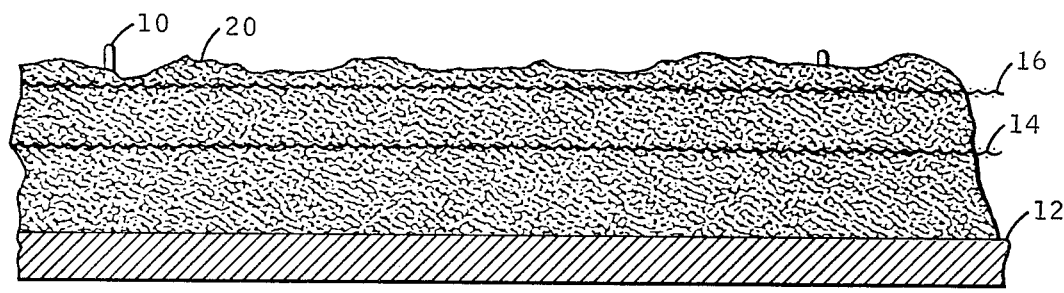
FIG. 2 is a schematic illustration of the assembly of FIG. 1 after the application of the foam.
Figure 3:
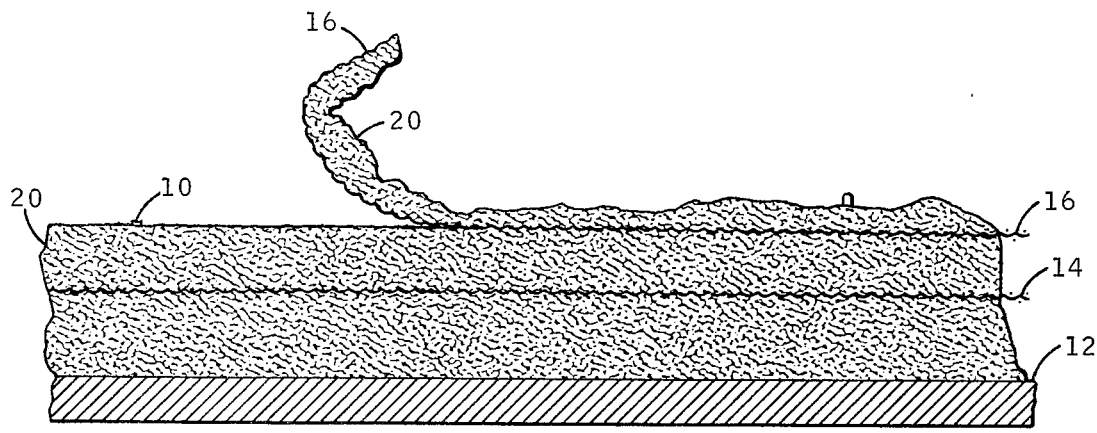
FIG. 3 is a schematic illustration of the assembly of FIG. 2 showing the removal of the screen.

The three major steps in the method of producing uniform thickness, uniform low density foam layers are illustrated in FIGS. 1, 2 and 3.

As seen in FIG. 1, a plurality of upstanding pins or studs 10 are secured to the surface of structure 12 which is to be coated with a foam layer. Studs 10 should have a height slightly greater than the thickness of the desired foam layer, and should be spaced closely enough to maintain a substantially even, taut screen therebetween. Typically, studs 10 may be spaced 2–4 feet apart. Any suitable material may be used for studs 10 and structure 12. Typical materials include metals such as aluminum or steel, synthetic resins, glass, etc. The studs may be secured to the structure surface in any suitable manner, such as by welding, adhesive bonding, or insertion into shallow holes.

If desired as a reinforcement for the foam layer, one or more spaced sheets of scrim 14 may be stretched taut and slipped down over studs 10. Any suitable material may be used for scrim, in any suitable weave. Typical materials include polyester fibers, such as those available under the trademark "Dacron" from E. I. duPont de Nemours, Inc., glass fibers, fine metal wires, nylon, etc. The fibers may be coated to increase adhesion to the foam material, if desired. Typical mesh sizes range from about 10 by 10 to about 4 by 4 thread strands per inch. Preferably, thread thickness should be no greater than 0.005 inch. Up to five spaced scrim sheets, each having a maximum fiber diameter of 0.005 inch and minimum, net-like, thread spacing of no less than about 0.1 inch may be used without excessive back pressure on the expanding foam.

After the scrim 14, if any, and any other objects to be imbedded in the foam are positioned, a sheet of screen material 16 is stretched taut and lowered over studs 10. Preferably, friction holding disks 18, which may typically be either "Tinerman" washers, split rings, or thin plastic disks having slits or holes slightly smaller than the stud diameter, are slipped down over studs 10 to hold screen 16 at the selected distance above surface 12. Disks 18 have a sufficiently tight friction fit on studs 10 to prevent screen 16 from being moved up as the foam expands. Since the upward force on screen 16 from the expanding foam is not great, disks 18 do not require an extremely tight fit on studs 10.

Screen 16 may be constructed from any suitable material woven in a suitable mesh size. The screen fibers should occupy less than 30% of the screen area to provide the least possible resistance to foam expansion. Where the screen occupies more than 30% of the screen area, the foam has been found to expand less than the desired amount and foam density is higher than desired due, apparently, to resistance to flow through the screen and resulting "back pressure" on the foam. While optimum results are probably obtained where the proportion of screen fibers to open area approaches zero, screen strength with extremely thin strands is too little to permit removal of excess foam by stripping away the screen. Also, if the mesh spacing is too great, an undesirably rough foam surface will be left. The screen should have the smallest fiber diameter and mesh size consistent with providing at least 70% open area and sufficient strength for the stripping operation. Small mesh size tends to produce a smoother final foam surface. Typical mesh sizes range from about 4 to about 8 threads per inch, with from about 4 to 5 threads per inch giving the optimum combination of stripping effectiveness and low resistance to foam expansion. Fiber diameters in the 0.02 to 0.06 inch range are typical, with the finer fibers being most effective. Typical screen fiber materials include metals, such as aluminum and stainless steel, copper, brass, monel and galvanized steel, glass, synthetic resins, such as nylon, fluorinated ethylene or propylene, natural fibers such as cotton and wool, and combinations thereof. Of these, galvanized steel wire is preferred because of its high strength, stiffness and low cost. Rather than woven mesh screens, perforated metal sheets having at least 70% open area and very small webs between perforations may be used, as may netting of the sort often molded or extruded from synthetic resins, such as polyolefins. If desired, the screen may be coated or treated to reduce wetting by, and adhesion to, the foam material. Best results are obtained in general with a woven mesh of about 0.02 inch galvanized wire mesh with a mesh spacing of about 0.25 inch, which provides about 80–90% open area. This provides the optimum combination of low resistance to foam flow, sufficient screen strength for the stripping step, and sufficiently small mesh size for a smooth foam surface.

While the foamable liquid may be applied in any suitable manner, spraying of foamable material 20 by spray head 22 through screen 16 is preferred. As sprayed, foam material 20 is in a very liquid, low viscosity state, which passes through screen 16 and scrim 14 without building up thereon. The foam then expands, due to a chemical reaction or other gas bubble producing mechanism. Spray head 22 is moved relative to surface 12 as indicated by the arrow adjacent to head 22 in FIG. 1, to deposit a substantially uniform layer of foamable liquid over surface 12. Spray head 22 and/or surface 12 may be moved in any suitable pattern to provide this approximately uniform application. As seen in FIG. 1, with rapidly expanding material, the foam forms immediately behind spray head 22. More slowly foaming materials would form a liquid foamable material layer over surface 22 and would foam more levelly, so that the foam slope shown in FIG. 1 would be more gradual.

As seen in FIG. 2, foam 20 expands up through scrim 14 and screen 16, finally forming an irregular upper surface with a thin skin or rind of cured material on the outer surface. Scrim 14 may be carried upwardly very slightly by the rising foam. If the final position of scrim is important, experience will teach the level at which scrim 14 should be positioned to give the desired final position for a particular foam composition.

Once foam 20 has cured to a self-sustaining, shape-retaining state, screen 16 can be removed. Of course, foam 20 can be completely cured before screen 16 is removed. If "Tinerman" washers are used for retaining disks 18, conventional end cutters are used to clip off the ends of studs 10 adjacent to disks 18. The cutters can simply be pushed down through foam 20 along studs 10 until disks 18 are touched, then the studs are snipped off. If disks 18 are, for example, plastic disks or split rings which are reasonably freely slidable along studs 10, the ends of the studs need not be removed.

The excess material extending through the screen may be removed in any suitable manner. With many foam materials, the screen is preferably stripped away after the foam has reached a shape-retaining, self-sustaining state but before the foam is fully cured, to prevent spalling or tearing of the foam layer which may adhere too strongly to the screen when fully cured. The screen may be removed by lifting one edge, then rolling the screen over the surface to pull the screen away primarily in tension. Alternatively, the screen may first be moved slightly in a direction parallel to the desired foam surface to shear the foam portions extending through the screen. For example, with 0.25 inch spaced grid (mesh), the screen might be moved about 0.3 inch parallel to the surface to shear foam extruding through the mesh, then be lifted away. This technique often produces a smoother foam surface. If desired, the foam extending through the screen may at least partially be removed prior to removal of the screen. Typically, after partial cure of the foam, a doctor blade or rotating stiff brush may be moved along the upper screen surface to remove at least part of the excess foam.

As seen in FIG. 3, screen 16 and the portion of foam 20 above the screen are removed in the embodiment shown by manually stripping the screen away. Pre-clipped studs 10 will protrude above foam 20 only very slightly. Unclipped studs 10, or the slight stub remaining after pre-clipping can be removed, if desired, with conventional wire cutters. If desired, disks 18 may be replaced on unclipped studs 10 after screen removal to act as secondary foam retainers in case of bond failure between the foam and surface 12. Most foam materials will automatically bond securely to surface 12 as the foam cures.

The substantially smooth foam surface can be treated in any suitable manner. After screen stripping, the foam surface will be slightly rough, with slight peaks or depressions within the area of each screen opening. This roughness may be desirable as an excellent bonding surface against which sheet materials can be adhesively laminated. If desired, the surface can be lightly sanded for improved smoothness.

DESCRIPTION OF PREFERRED EMBODIMENTS

The following examples provide details of several preferred embodiments of the method of this invention. All parts and percentages are by weight unless otherwise indicated.

EXAMPLE I

A number of 2-inch long, 0.07 inch diameter, aluminum pins or studs are welded to a large aluminum plate at the corners of a 3-foot square grid. A sheet of nylon scrim having an average strand diameter of about 0.005 inch and grid size of about 0.25 inch is stretched taut and slipped over the studs to about ½ inch above the plate. An aluminum screen having strand diameters of about 0.028 inch and a grid size of about 0.25 inch is stretched taut and slipped over the studs. A Tinerman washer is slipped over each stud and pressed down until each is about 1 inch above the plate. A foamable liquid, Stepin BX-250A, is prepared to the proper spray consistency. A substantially uniform layer of the foamable liquid is sprayed through the screen onto the plate with a Gusmer spray gun, proportioning unit Model FF, manufactured by Gusmer, Inc., with 52.17 to 47.83 ratio pumps. The spray gun is moved in a scanning pattern over the screen to provide uniform application. The self-rising foam is allowed to rise and cure to the point where it is self-sustaining. An irregular foam surface extends above the screen. End-cutting wire cutters are slipped down through the foam over each stud and each stud is clipped off adjacent to the Tinerman washers. The screen is lifted and rolled back, causing the washers to pop off. The resulting foam layer has uniform thickness and uniform low density. The surface is level but moderately rough. Light hand sanding with fine sandpaper fastened to a block produces a smooth, even surface.

EXAMPLE II

A number of 3 inch long, 0.1 inch diameter aluminum pins are placed in 0.5 inch deep, 0.1 inch diameter holes in a 2 inch thick aluminum plate to be foam coated. The holes are located at the corners of a 2 foot grid across the plate surface. Two sheets of Dacron polyester scrim from E. I. duPont de Nemours, Inc. are stretched taut and slipped over the pins to heights of 0.8 and 1.8 inches above the plate surface. The scrim fibers have an average diameter of about 0.003 inch and a net-like spacing of about 0.12 inch. A sheet of galvanized steel woven wire screen, having strand diameters of about 0.02 inch and a mesh spacing of about 0.25 inch is stretched taut and slipped over the pins to a height of about 2.7 inches above the plate surface. Thin, 1 inch diameter flexible acrylic disks having "X" shaped slits at the centers, are slipped over the pins and into contact with the screen. A mixture of catalyzed urethane prepolymer, a modified 80% 2,4-toluene diisocyanate plus 20% 2,6-toluene diisocyanate, available from Allied Chemical under the "Nacconate 4040" trademark, and a trichlorofluoromethane blowing agent, available under the Fluorocarbon-11 tradename, is prepared. The liquid is poured from a moving container through the screen to provide even application. The foam is allowed to rise and cure to at least a self-supporting state. Sufficient liquid is applied to produce a final rough foam layer having a surface rind and a thickness of about 3 to 3.2 inches, projecting through the screen. The screen is lifted away, taking the plastic disks and projecting foam with it. The aluminum pins are clipped off just below the foam surface with conventional wire cutters, and the surface is lightly sanded after cure of the rigid urethane foam is completed, to remove the slight (less than about 0.1 inch) surface roughness.

EXAMPLE III

A large glass fiber reinforced polyester resin sheet is prepared for foam insulation coating by bonding with a conventional epoxy adhesive a plurality of 3 inch long, 0.2 inch diameter, glass fiber reinforced polyester resin studs to the sheet surface on about 2 foot centers. A screen of molded polyethylene netting having an average strand diameter of about 0.01 inch and a mesh opening diameter of about 0.3 inch is stretched taut and lowered over the upstanding studs to a height of about 2.5 inches above the sheet surface. Polythylene split rings having inner diameters of just less than 0.2 inch and outer diameters of about 0.5 inch are slipped over each stud into contact with the screen. A urethane foam mixture is prepared and uniformly sprayed over the sheet surface through the screen. The mixture consists of about 100 parts polyether triol (3000 molecular weight), about 38 parts of an 80:20 mixture of the 2,4 and 2,6 isomers of toluene diisocyanate, about 1 part stannous oleate, about 1 part ethyl morpholine, about 1 part silicone copolymer surfactant and about 2.9 parts water. The material is sprayed onto the sheet through a line of De Vilbiss spray guns as the sheet is moved past the spray gun array. The foam immediately begins rising due to generation of $CO_2$ bubbles by reaction of the diisocyanate and water, and the resin begins to polymerize due to reaction of the diisocyanate, polyol and water. As the foam rises and cures, it extends above the screen, forming a solid skin above the screen. When the foam becomes self supporting, the screen is lifted away, sliding the split rings off of the studs with the screen. The ends of the studs extending above the foam coating are clipped off with conventional wire cutters. A very uniform, low density foam results, well bonded to the supporting sheet.

EXAMPLE IV

A number of stiff steel wires having lengths of about 3 inches are tack welded to a steel tank surface about 18 inches apart. Three sheets of lightweight glass fiber scrim are stretched taut and slipped over the wires at heights above the tank surface of about 0.5, 1.0 and 1.5 inches. A perforated aluminum sheet, having about 0.2 inch hexagonal holes punched closely together to provide about 85% of the sheet as open area, is slipped over the wires and secured with Tinerman washers at a height of about 2.2 inches from the tank. A layer of foamable epoxy resin, available under the trademark "Epon Foam 175" (condensation products of epichlorohydrin and bisphenol-A) from Shell Chemical Company, is applied by spraying uniformly over the tank surface through the sheet and allowed to expand outwardly through the scrim and screen. After the resin is sufficiently cured to be self-supporting, the wires are slipped off at the Tinerman washers and the screen is stripped away. A generally smooth, even epoxy foam surface results.

EXAMPLE V

An aluminum sheet box, about 3 feet by 3 feet by 6 inches high, with an open top and bottom, is placed over a steel plate. About 100 parts of a phenolic foaming resin, available from Union Carbide Corporation under the BRL-2759 trademark, are mixed with about 1 part of a surfactant, a polyoxyethylene derivative of fatty and partial esters of sorbitol anhydrides, available from Atlas Chemical Industries, Inc., under the "Tween No. 40" trademark, about 6 parts of isopropyl ether as a blowing agent, and about 10 parts of a toluene sulfonic acid catalyst. A screen made by weaving 0.03 inch nylon monafilament to form a 0.3 inch mesh is stretched over the box top and the mixture is poured through the screen, moving the pouring container to provide even application. After the foam has risen through the screen and partially cured, the screen is removed by moving it first generally parallel to the box top, then lifting it away. The shearing action of the screen produces a level, smooth, low density foam surface, although foam density is higher and non-uniform near the box walls.

While certain specific materials, components and arrangements were described in detail in the above description of preferred embodiments, these may be varied and other components and ingredients may be used, where suitable, with similar results. Various modifications, applications and ramifications of the present invention will occur to those skilled in the art upon reading the present disclosure. These are intended to be included within the scope of this invention, as defined in the appended claims.

I claim:

1. A method of forming a coating of low, uniform, density foam to a uniform thickness on a surface, which method comprises the steps of:
   securing a plurality of spaced upstanding studs to a surface to be coated with foam;
   stretching taut a sheet of screen material having at least about 70% open area;
   lowering said screen over said studs to a selected distance above said surface;
   releasing said screen so that said screen is supported by frictional engagement with said studs;
   projecting a foamable liquid material through said screen in a manner producing a substantially uniform coating over said surface;
   expanding said foam until the foam coating extends through said screen;
   at least partially curing said foam to a self-sustaining state; and
   stripping away said screen, carrying therewith the foam which has expanded through said screen.

2. The method according to claim 1 further including the step of smoothing the foam surface after said screen is stripped away.

3. The method according to claim 1 wherein said screen comprises fibers having diameters of from about 0.02 to 0.06 inch and mesh sizes in the range of about 4 to about 8 fiber strands per inch.

4. The method according to claim 1 further including the steps of placing friction holding disks over each stud into contact with the upper surface of said screen, after placement of said screen, and removing said disks after said at least partial curing of said foam.

5. The method according to claim 1 further including the step after said at least partial curing of said foam, of removing at least that portion of each of said studs which extends above said screen.

* * * * *